(12) United States Patent
Heinonen

(10) Patent No.: US 11,592,568 B2
(45) Date of Patent: Feb. 28, 2023

(54) MEASUREMENT DEVICE AND METHOD OF OPERATING THEREFOR

(71) Applicant: AI4 International Oy, Helsinki (FI)

(72) Inventor: Tero Heinonen, San Francisco, CA (US)

(73) Assignee: AI4 International Oy, Helsinki (FI)

(*) Notice: Subject to any disclaimer, the term of this patent is extended or adjusted under 35 U.S.C. 154(b) by 597 days.

(21) Appl. No.: 16/657,021

(22) Filed: Oct. 18, 2019

(65) Prior Publication Data
US 2021/0116567 A1    Apr. 22, 2021

(51) Int. Cl.
| | |
|---|---|
| *G01S 17/89* | (2020.01) |
| *G01S 7/481* | (2006.01) |
| *G01S 17/10* | (2020.01) |
| *G01S 7/4915* | (2020.01) |
| *G01S 7/4863* | (2020.01) |

(52) U.S. Cl.
CPC ............ *G01S 17/89* (2013.01); *G01S 7/4816* (2013.01); *G01S 7/4863* (2013.01); *G01S 7/4915* (2013.01); *G01S 17/10* (2013.01)

(58) Field of Classification Search
None
See application file for complete search history.

(56) References Cited

U.S. PATENT DOCUMENTS

| | | | |
|---|---|---|---|
| 2010/0123894 A1* | 5/2010 | Tsai | G01C 15/002 356/4.07 |
| 2012/0038903 A1 | 2/2012 | Weimer et al. | |
| 2015/0138053 A1* | 5/2015 | Aiden | G02F 1/1323 345/88 |
| 2016/0003946 A1 | 1/2016 | Gilliland et al. | |
| 2016/0109575 A1 | 4/2016 | Oggier et al. | |
| 2020/0056885 A1* | 2/2020 | Rutkiewicz | G01S 17/95 |
| 2021/0072081 A1* | 3/2021 | Wang | G06N 20/00 |

\* cited by examiner

*Primary Examiner* — Eileen M Adams
(74) *Attorney, Agent, or Firm* — Ziegler IP Law Group LLC

(57) ABSTRACT

A measurement device including a light source with a first emitter and a second emitter, and a light intensity measurement unit. A controller configures the first emitter to emit a first light beam using a first operative parameter and the second emitter to emit a second light beam using a second operative parameter. The controller configures the light intensity measurement unit to measure a first light intensity value of the first light beam and a second light intensity value of the second light beam. The controller compares the measured first and second light intensity values with a target intensity value; and adjust the first operative parameter and the second operative parameter based on the comparison to derive a first adjusted operative parameter and a second adjusted operative parameter. The controller configures the emitters to use the adjusted operative parameters during a measurement and a first narrow band filter is arranged to filter the light beams received by the light intensity measurement unit and a second narrow band filter is arranged to filter the light beams emitted by the light source.

17 Claims, 5 Drawing Sheets

MEASUREMENT DEVICE AND METHOD OF OPERATING THEREFOR

TECHNICAL FIELD

The present disclosure relates generally to a measurement device for remote detection and a method of operating the measurement device; and more specifically, to a Light Detection and Ranging (LiDAR) device and method of operating the LiDAR device utilizing optimum operative parameters for multiple light emitters to provide narrow band light pulse under different operating conditions.

BACKGROUND

Autonomous cars need to detect their environments for other cars, pedestrians, animals, road lanes, road surface condition, traffic control devices and other road users. Autonomous cars make their real-time driving decision based on what they can perceive from the environment. A failure to perceive the surroundings may cause an immediate accident and hence the reliability of sensing and perception must be as high as possible. These autonomous cars, generally, position themselves and detect surroundings using a variety of sensor technologies. For example, LiDAR (Light Detection and Ranging) devices are most commonly used sensors which uses light beams to make precise distance measurements over short and long distances.

LiDAR devices, generally, employs light emitting diodes (LEDs) as light emitters for generation of light beams. The LEDs are made of direct energy gap semiconductors. On forward biasing the LED, excess electron hole pairs are stored in the diode. These excess electron hole pairs recombine with each other producing photons of light which are emitted as light beams. The emitted light intensity is proportional to the excess charges which in turn increases linearly with the diode current.

It is known that two LEDs operating with same operative parameters (like same current supplied) and under same operating conditions (like same operating temperature) may generate light beams with different intensities due to their inherent features, such as the process variations in manufacturing of the LED in the factory or the like. Further, a change in the operating temperature can cause an LED to change its central wavelength, spectral bandwidth, and/or emitted power. This variation in the emission characteristics can cause ambiguity during processing of return signal (e.g., after reflection from an object) in the LiDAR device, and may result in an increased error and limits applicability of LEDs in the LiDAR devices.

Therefore, in light of the foregoing discussion, there exists a need to overcome the aforementioned drawbacks associated with measurement devices; and provide a measurement device and a method of operating the measurement device utilizing optimum operative parameters for different light emitters to provide narrow band light pulse even under different operating conditions.

SUMMARY

The present disclosure seeks to provide a solution to the existing problems associated with developing effective measurement devices that can address the variation in emission characteristics of Light Emitting Diodes (LEDs) therein. The present disclosure seeks to provide a measurement device that provides for mitigating the effect of variation in emission characteristics of LEDs due to change in operating conditions. The present disclosure also seeks to provide a method of operating a measurement device that provides for mitigating the effect of variation in emission characteristics of LEDs due to change in operating conditions. An aim of the present disclosure is to provide a solution that at least partially overcomes the problems encountered in prior art by comparing two or more emitters in the measurement device for intensity of their emitted light beams, and adjusting operative parameters of one or more emitters in the measurement device based on the comparison.

In one aspect, an embodiment of the present disclosure provides a measurement device for measuring a distance, comprising:
  a light source comprising a first emitter and a second emitter;
  a light intensity measurement unit; and
  a controller operatively coupled to the first and second emitter of the light source and the light intensity measurement unit, wherein the controller is operable to:
  set a target intensity value;
  set a first operative parameter for the first emitter;
  set a second operative parameter for the second emitter;
  configure the first emitter to emit a first light beam using the first operative parameter;
  configure the light intensity measurement unit to measure a first light intensity value of the first light beam;
  configure the second emitter to emit a second light beam using the second operative parameter;
  configure the light intensity measurement unit to measure a second light intensity value of the second light beam;
  compare the measured first and second light intensity values with the target intensity value;
  adjust the first operative parameter and the second operative parameter based on the comparison to derive a first adjusted operative parameter and a second adjusted operative parameter; and
  use the adjusted operative parameters during a measurement
wherein a first narrow band filter is arranged to filter the light beams received by the light intensity measurement unit and a second narrow band filter is arranged to filter the light beams emitted by the light source.

In another aspect, an embodiment of the present disclosure provides a method of operating a measurement device for measuring a distance, the measurement device comprising:
  a light source comprising a first emitter and a second emitter;
  a light intensity measurement unit; and
  a controller operatively coupled to the first and second emitter of the light source and the light intensity measurement unit,
wherein the method comprises:
  setting a target intensity value;
  setting a first operative parameter for the first emitter;
  setting a second operative parameter for the second emitter;
  emitting, with the first emitter, a first light beam using the first operative parameter;
  measuring, with the light intensity measurement unit a first light intensity value of the first light beam;
  emitting, with the second emitter, a second light beam using the second operative parameter;
  measuring, with the light intensity measurement unit a second light intensity value of the second light beam;

comparing the measured first and second light intensity values with the target intensity value;

adjusting the first operative parameter and the second operative parameter based on the comparison to derive a first adjusted operative parameter and a second adjusted operative parameter;

using the adjusted operative parameters during the measurement of the distance and arranging a first narrow band filter to filter the light beams received by the light intensity measurement unit and a second narrow band filter to filter the light beams emitted by the light source.

Embodiments of the present disclosure substantially eliminate or at least partially address the aforementioned problems in the prior art, and provides a measurement device and method of operating therefor capable of substantially mitigating the effect of variation in emission characteristics of LEDs due to their inherent features and/or change in operating conditions or the like, for example, for Light Detection and Ranging (LiDAR) devices being used in autonomous driving.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1A:
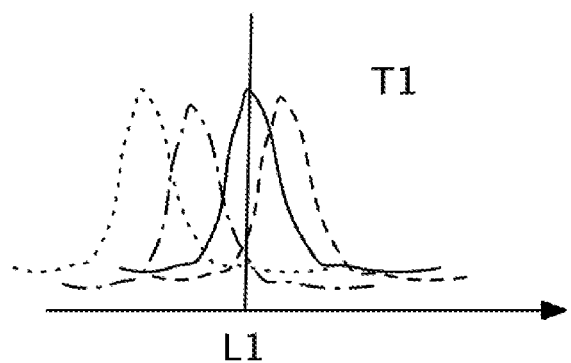
FIGS. 1A-1B are exemplary spectral diagrams of an exemplary emitter used in a measurement device for two different operating temperature conditions.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In one aspect, an embodiment of the present disclosure provides a measurement device for measuring a distance, comprising:

a light source comprising a first emitter and a second emitter;

a light intensity measurement unit; and a controller operatively coupled to the first and second emitter of the light source and the light intensity measurement unit, wherein the controller is operable to:

set a target intensity value;

set a first operative parameter for the first emitter;

set a second operative parameter for the second emitter;

configure the first emitter to emit a first light beam using the first operative parameter;

configure the light intensity measurement unit to measure a first light intensity value of the first light beam;

configure the second emitter to emit a second light beam using the second operative parameter;

configure the light intensity measurement unit to measure a second light intensity value of the second light beam;

compare the measured first and second light intensity values with the target intensity value;

adjust the first operative parameter and the second operative parameter based on the comparison to derive a first adjusted operative parameter and a second adjusted operative parameter;

use the adjusted operative parameters during a measurement wherein a first narrow band filter is arranged to filter the light beams received by the light intensity measurement unit and a second narrow band filter is arranged to filter the light beams emitted by the light source.

In another aspect, an embodiment of the present disclosure provides a method of operating a measurement device for measuring a distance, the measurement device comprising:

a light source comprising a first emitter and a second emitter;

a light intensity measurement unit; and a controller operatively coupled to the first and second emitter of the light source and the light intensity measurement unit, wherein the method comprises:

setting a target intensity value;

setting a first operative parameter for the first emitter;

setting a second operative parameter for the second emitter;

emitting, with the first emitter, a first light beam using the first operative parameter;

measuring, with the light intensity measurement unit, a first light intensity value of the first light beam;

emitting, with the second emitter, a second light beam using the second operative parameter;

measuring, with the light intensity measurement unit, a second light intensity value of the second light beam;

comparing the measured first and second light intensity values with the target intensity value;

adjusting the first operative parameter and the second operative parameter based on the comparison to derive a first adjusted operative parameter and a second adjusted operative parameter;

using the adjusted operative parameters during the measurement of the distance and arranging a first narrow band filter to filter the light beams received by the light intensity measurement unit and a second narrow band filter to filter the light beams emitted by the light source.

The present disclosure seeks to provide a measurement device and a method for operating the measurement device. In particular, the present disclosure seeks to provide a Light Detection and Ranging (LiDAR) device and a method for operating the LiDAR device. Hereinafter, the terms "measurement device" and "LiDAR device" have been interchangeably used without any limitations. The LiDAR device of the present disclosure provides for mitigating the effect of variation in emission characteristics of Light Emitting Diodes (LEDs) due to their inherent features and/or change in operating conditions, and thereby reduce ambiguity in detection of return signals. The present LiDAR devices have the potential to be utilized extensively in applications like autonomous vehicle navigation, mobile mapping and the like. For example, in autonomous vehicle navigation, with reduced ambiguity, the functioning and the real-time driving decision making of the autonomous vehicles is improved significantly. This helps to reduce the number of accidents and may potentially save many lives.

The LiDAR device comprises a light source to emit light beams. In particular, the LiDAR device comprises a first emitter and a second emitter to emit light beams. Optionally, the light source comprises more than two emitters and the emitters are arranged in a pattern. The light source might comprise for example 5-10 emitters, 10-20 emitters or 20-50. Each emitter can be driven separately with their own operative parameters. Example of an operative parameter is used current to drive an emitter. Each emitter might have their own driver. The driver can be controlled by controller. That is, although, the present disclosure has been described in terms of the light source employing two emitters, the light source may include any suitable number of and/or combination of emitters without any limitations. Further, the arrangement pattern of the emitters, including the first emitter and the second emitter, may be linear, circular, matrix form or the like. The first emitter and the second emitter may be configured to emit continuous light beams as laser pulses. The first emitter and the second emitter may include one of light emitting diodes (LEDs), gas lasers, chemical lasers, solid-state lasers, semiconductor laser diodes ("laser diode"), among other possible light types. In the present examples, the first emitter and the second emitter have been described in terms of using LEDs for emitting light beams.

In some examples, each of the first emitter and the second emitter may include LEDs which may be packaged individually or in groups, generally in one-dimensional rows/arrays (diode bar) or two dimensional arrays (diode-bar stack). A diode array stack is generally a vertical stack of diode bars. LED diode bars or arrays generally achieve substantially higher power, and cost effectiveness than an equivalent single large capacity LED. High-power diode bars generally contain an array of broad-area emitters, generating light beams with tens of watts of power. High-power diode bars can further be stacked to produce high-power stacked diode bars for generation of extremely high powers of hundreds or thousands of watts. In one example, the diode bar may be a type of semiconductor laser containing a one-dimensional array of broad-area emitters or alternatively containing sub arrays containing 10-20 narrow stripe emitters. Such diode arrays may be configured to emit a light beam into free space or into a fibre as desired. Diode arrays, bars and/or stacks, such as those described above may be used in association with embodiments of the present disclosure.

The LiDAR device also comprises at least one receiver operable to detect the laser beams for sensing purposes. The LiDAR device uses the emitters and the receiver to cover a given field of view where the emitters generate single pulse or a multi-pulse light beams that are sampled by the receiver. In some examples, the LiDAR device may be a non-scanning, solid-state device having multiple emitters and receivers that may be arranged in any suitable manner. These sets of emitters and receivers may be optically configured such that the emitters provide on-coincident axis laser beam to the corresponding receiver.

The LiDAR device further comprises a light intensity measurement unit. The light intensity measurement unit may be a device measuring the intensity of light emitted from the LiDAR device, such as a light diode integrated into the optical paths of the first emitter and the second emitter, and configured to measure the intensity of the light emitted from the first emitter and the second emitter in the LiDAR device. Further, in some examples, the light intensity measurement unit may be operatively coupled with the receiver of the LiDAR device to measure the light received into the receiver, such as a photon counter embedded in the receiver, receiver itself, a photo diode in the optical path of the receiver optics and the like.

In an embodiment, the light intensity measurement unit is a broadband receiver. For this purpose, the light intensity measurement unit may comprise of detectors which are sensitive to a band of wavelengths. Examples of such detectors include: active-pixel sensor (APS), passive-pixel sensors, back-illuminated detector, photodiodes, 3T pixels and cells, 4T pixels and cells, 5T pixels, 6T pixels, thin-film transistors (TFT), pixels sensitive to different wavelengths, Bayer filter sensors, colour filter arrays, layered pixel detectors, and the like. For example, the multispectral receiver may comprise of pixels which each are sensitive to red, green, and blue, ultraviolet, near infrared, or to wavelengths between 300 nm to 2000 nm.

In some examples, the light intensity measurement unit may also include optics which focus light on the area in the imaging sensor sensitive to light. Further, in some examples, the light intensity measurement unit may also include optics which refract, retract, disperse, scatter, or absorb light. Examples of such optics include lenses, prisms, dichroic prisms, polarizing filters, objects causing interference such as apertures and slits. Specifically, the optics may be used to filter or break light up into constituents based on polarization, wavelength and phase, and target the light to desired areas in the multispectral receiver based on these constituents or filter or pass specific constituents.

A first narrow band filter is arranged to filter light beams received by the light intensity measurement unit and a second narrow band filter is arranged to filter light beams emitted by the light source. An example of a first narrow band filter and a second narrow band filter is a thin-film narrow band filter. Since (Thin-film) narrowband filters have a characteristic of having angular dispersion (filtered wavelength varies as a function of angle from normal) the first and the second filter are preferably matched angle-tuned filters. This enables to filter wavelengths as a function of the angle of arrival from normal. The setup enables to provide narrow band filtering of 0.5 nm-2 nm. The matched angle-tuned filters (the first filter and the second filter) have substantial similar angle-tuning properties. Indeed the filters for the light source and measurement unit have thus same filtered wavelength shift as a function of the angle of arrival from the normal. In addition this set up results field of views to be matched. Further, optionally, a rotatable prism can be arranged between light source and the second filter. This enables to implement the light source with a single physical emitter. Rotation of prism can be used to select which light wavelengths are emitted. This enables a single physical emitter to behave as two or more emitters i.e. light source can be considered to comprise plurality of perceived emitters.

Optionally the narrow band filter may be any optical or optoelectronic device, system or component, including but not limited to filters, mirrors, prisms, lenses, and the like which filter the constituents of light based on properties of the light including but not limited to wavelength, or a combination thereof. The narrow band filter may be, for example, a passband optical filter, a passband coating on a lens, or piezo-electrically adjustable dielectric mirrors, etc. In some examples, the narrow band filter can pass multiple separate wavelengths, for example 532 nm and 1064 nm. In an embodiment, the narrow band filter is a 0.5-3 nanometres bandwidth filter.

Further more as an example the narrow band filter may be implemented in various arrangements, including Bragg mirrors, distributed Bragg reflector, dielectric mirror, or other similar means. The mirror or lens arrangements may include at least two optical elements, for example, but not limited to, dielectric layers, which are controlled by an actuation mechanism by varying their distance or relative position. Varying the position of the layers can be implemented for example, but not limited to, using piezoelectric mechanism, piezo actuated mechanism or MEMS based mechanisms. For example, without limitation, these mechanisms allow control of the median wavelength with a few nanometre resolutions, pass band having a normally distributed shape with 3-20 nm standard deviation. Typical optical aperture size can be for example, without limitation, 2 mm to 20 mm. This arrangement can be programmed to vary very rapidly for example, without limitation, 200-1,000 Hz.

The LiDAR device further comprises a controller operatively coupled to the first and second emitter of the light source and the light intensity measurement unit. The controller may be a structure and/or module that comprise programmable and/or non-programmable components configured to store, process and/or share information. The controller may comprise any arrangement of physical or virtual computational entities capable of enhancing information to perform various computational tasks. The controller may comprise any arrangement of analog, digital or both analog and digital components. Optionally, the controller function may be embedded or integrated to other components. It should be appreciated that the controller may be both single hardware server and/or a plurality of hardware servers operating in a parallel or distributed architecture. In an example, the controller may comprise components such as memory, a processor, a network adapter and the like, to store, process and/or share information with other computing components, such as user device/user equipment. Optionally, the controller is implemented as Application-specific integrated circuit (ASIC) chip or Field-programmable gate array (FPGA) program. Optionally, the controller can be implemented as a computer program that provides various services (such as database service) to other devices, modules or apparatus. In some examples, the controller may include a first driver connected to the first emitter and a second driver connected to the second emitter. The dedicated first driver and the second driver may control operations of the diode bars of LEDs in the respective first emitter and the second emitter.

It may be understood that the temperature can have negative effect on the emission characteristics of the LEDs in the first emitter and the second emitter of the LiDAR device. Concerning the spectrum of the emitted light beams by any LED, it is concentrated in and around a specific central wavelength defined by the energy gap, $E_g = hC/\lambda$, where h is the Planck's constant, C is the speed of light and $\lambda$ is the wavelength of the emitted light. Due to increase in the temperature, the band gap energy decreases and the emitted wavelength increases. It follows that the peak wavelength shifts to longer wavelength and therefore this shift is also sometimes called as the "red shift." It is to be noted that there is almost a linear relationship between operating temperature of the LED and central wavelength of the emitted light beam therefrom. Therefore, it can be understood that higher the variation in the operating temperature of the LEDs, the wider the bandwidth will be. Thus with the variation in the operating temperature, the LiDAR device may not be able to provide desired level of performance and reliability with such wider bandwidth of emitted light beams. To compensate for this effect, the controller is operable to perform the following steps as described in the subsequent paragraphs. Further due to variations in manufacturing process light emitters such as LED's or lasers might have different central wavelengths even when originating from a same manufacturing patch. Variations in central wavelength of emitters might lead to situation where light beam from an emitter is blocked by the narrow band filter.

The controller is operable to set a target intensity value. The target intensity value may be an arbitrary value for light intensity of the light beams emitted by the first emitter and the second emitter. In an embodiment, the target intensity value is set to maximize power of the total emitted light by the first emitter and the second emitter, in the LiDAR device. In another embodiment, the target intensity value is set to maximize power of the total emitted light by the first emitter and the second emitter to the level of eye-safety, i.e. of people in proximity of the LiDAR device.

In an embodiment, the target intensity value is a function of a target measurement distance range. That is, the target intensity value is set based on an approximate distance of the target object for which the LiDAR device is being implemented for distance measurement purposes and the like. In other words, in a situation in which the target object is at a larger distance from the LiDAR device, then the target intensity value is set to be high in comparison to a situation in which the target object is at a relatively shorter distance from the LiDAR device, and vice-versa. It may be understood that this being done so as to limit the intensity of the emitted light beams from the first emitter and the second emitter of the LiDAR device, as measurement up to shorter distances may not necessarily require utilization of high intensity light beams for measurement purposes, and this way the LiDAR device may save on power consumption. Further, this may help to limit the intensity values of the light beams the first emitter and the second emitter of the LiDAR device within prescribed eye-safety level as discussed above.

Further, the controller is operable to set a first operative parameter for the first emitter and set a second operative parameter for the second emitter. In particular, the first driver, in the controller, may set the first operative parameter for the first emitter; and the second driver, in the controller, may set the second operative parameter for the second emitter. In one example, the operative parameters may include, among other things, current supplied to the emitters. Therefore, the first operative parameter may be defined based on current supplied to the first emitter, and the second operative parameter may be defined based on current supplied to the second emitter. In other examples, the operative parameters may also include voltage provided to the emitters, operating time of the emitters, operating temperature of the emitters, and the like.

Further, the controller configures the first emitter to emit a first light beam using the first operative parameter. The controller also configures the light intensity measurement unit to measure a first light intensity value of the first light beam. Similarly, the controller configures the second emitter to emit a second light beam using the second operative parameter. The controller also configures the light intensity measurement unit to measure a second light intensity value of the second light beam. It may be contemplated that the controller may change the sequence described above and may first configure the first emitter and the second emitter to emit the respective light beams, and then configure the light intensity measurement unit to measure light intensity values of the light beams emitted by the first emitter and the second emitter without affecting the scope of the present disclosure. The techniques employed for such steps may be contemplated by a person skilled in the art and thus have not been described herein for the brevity of the present disclosure.

The controller is then operable to compare the measured first and second light intensity values with the target intensity value. That is, the controller independently compares the measured first intensity value with the set target intensity value, and further compares the measured second intensity value with the set target intensity value. In particular, based on the comparison, the controller may be configured to check for which of the measured first light intensity value and second light intensity value is closer to the target intensity value. Further, in some examples, the controller may check, if any, of the measured first light intensity value and second light intensity value is above the target intensity value.

Further, the controller is operable to adjust the first operative parameter and the second operative parameter based on the comparison to derive a first adjusted operative parameter and a second adjusted operative parameter. That is, there is a correlation between the measured first and second light intensity values and the adjustment of the first operative parameter and the second operative parameter. Herein, the light intensity values are considered to adjust the first operative parameter and the second operative parameter. The adjustments may result in optimum operative parameters for operation of the first emitter and the second emitter. For example, the adjustment can result in using 10% power in the first emitter and 60% power in the second emitter. Further, in some examples, the adjustment may be done by using estimation techniques.

In an embodiment, the first operative parameter is configured to be adjusted to a zero value and the second operative parameter is configured to be adjusted to a measurement operating value if, based on the comparison, the second light intensity value is closer to the target intensity value than the first intensity value. That is, if it is determined that the second light beam emitted from the second emitter has intensity closer to the target intensity value as compared to the first light beam from the first emitter, then the controller may power off the first emitter and use the second emitter for measurement purposes. Thus, the controller may implement the emitter which is emitting light beam with intensity closer to the target intensity value. As described herein, the measurement operating value is a value or a set of values for the second operative parameter for the second emitter which optimizes for the second light beam to be emitted with intensity as close as possible to the target intensity value while consuming close to minimum possible power for achieving the same.

In an embodiment, the first operative parameter is configured to be adjusted to a zero value and the second operative parameter is configured to be adjusted to a first measurement operating value if, based on the comparison, both the first measured intensity value and the second measured intensity value are within a predefined range from the target intensity value, and power consumption of the first emitter is higher than the power consumption of the second emitter. That is, if it is determined that both the first emitter and the second emitter are emitting light beams with intensities closer to the target intensity value, then the controller may check for power consumption of the first emitter and the second emitter, and use the emitter which is consuming less amount of power compared to the other one. Thus, the controller may implement the emitter which is emitting light beam with intensity closer to the target intensity value and further, in the process of doing so, using lesser amount of power for its operations. As described herein, the first measurement operating value is a value or a set of values for the second operative parameter for the second emitter which optimizes for the second light beam to be emitted with intensity as close as possible to the target intensity value while consuming close to minimum possible power for achieving the same.

In an embodiment, the second operative parameter is configured to be adjusted to a second measurement operating value and the first operative parameter is configured to be adjusted a third measurement operating value if, based on comparison, a combination of the first light intensity value and the second light intensity value is within a predefined range from the target intensity value. That is, if it is determined that a combination of the first light beam and the second light beam, from the first emitter and the second emitter respectively, is achieving intensity closer to the target intensity value, then the controller may use both the first emitter and the second emitter with corresponding adjusted values. As described herein, the combination may be based on alternatively or simultaneously using the first emitter and the second emitter. Further, the second measurement operating value and the third measurement operating value are values or sets of values for the second operative parameter for the second emitter and the first operative parameter for the first emitter respectively, which optimizes for the respective second light beam and the first light beam, when emitted, to have combined intensity as close as possible to the target intensity value while consuming close to minimum possible power for achieving the same.

Optionally, the controller is operable to configure the light source to utilize the adjusted parameters for measurement purposes for a predefined period of time. Further, the controller is operable to repeat steps for adjusting the first or second operative parameters after expiry of the predefined period of time to further adjust the operative parameters. That is after expiry of the predefined period of time, the controller may again configure the light intensity measurement unit to measure the first light intensity value of the first light beam and to measure the second light intensity value of the second light beam, perform the comparison, and adjust the first operative parameter and the second operative parameter based on the comparison. This is being done to compensate for the varying operating conditions, like the operating temperature of the LEDs in the first emitter and the second emitter, ambient temperature, wind conditions, operating time of the LiDAR device, other sources of temperature variation (such as thermal connections between different components of the LiDAR device as part of the integration), etc. over a period of time of operation of the LiDAR device. This way the LiDAR device may always be configured to operate at optimum adjusted parameters for the first emitter and the second emitter in spite of time varying operating conditions of the LiDAR device.

Optionally, the first emitter and the second emitter are configured to emit light with a central wavelength different from each other. This is being done, so that the LiDAR device can adapt to different operating conditions. Since, as described above, the intensity of the emitted light beam is dependent on the central wavelength of the corresponding emitter. Therefore, by selecting the first emitter and the second emitter to have different central wavelengths, the LiDAR device may be configured to operate to provide light beams with a broader range of intensities, which, in turn, increases the probability of having at least one of the first light beam and the second light beam to be closer to the target intensity value as defined above.

The present disclosure also relates to the method as described above. Various embodiments and variants disclosed above apply mutatis mutandis to the method.

Optionally, the adjusting of the first operative parameter and the second operative parameter comprises adjusting the first operative parameter to a zero value and adjusting the second operative parameter to a measurement operating value, if based on the comparison, the second light intensity value is closer to the target intensity value than the first intensity value.

Optionally, the adjusting of the first operative parameter and the second operative parameter comprises adjusting the first operative parameter to a zero value and the second operative parameter to a first measurement operating value if, based on the comparison, both the first measured intensity value and the second measured intensity value are within a predefined range from the target intensity value; and power consumption of the first emitter is higher than the power consumption of the second emitter.

Optionally, the adjusting of the first operative parameter and the second operative parameter comprises adjusting the second operative parameter to a second measurement operating value and the first operative parameter to a third measurement operating value if, based on comparison, combination of the light first intensity value and the second light intensity value is within a predefined range from the target intensity value.

Optionally, the method comprises utilizing the adjusted parameters for measurement purposes for a predefined period of time.

Optionally, the method comprises adjusting the operative parameters further after expiry of the predefined period of time.

Optionally, the target intensity value is calculated as a function of a target measurement distance range.

According to alternative embodiment of the present disclosure provides a measurement device for measuring a distance, comprising:
  a light source comprising a first emitter and a second emitter;
  a light intensity measurement unit; and
  a controller operatively coupled to the first and second emitter of the light source and the light intensity measurement unit, wherein the controller is operable to:
  set a target intensity value;
  set a first operative parameter for the first emitter;
  set a second operative parameter for the second emitter;
  configure the first emitter to emit a first light beam using the first operative parameter;
  configure the light intensity measurement unit to measure a first light intensity value of the first light beam;
  configure the second emitter to emit a second light beam using the second operative parameter;
  configure the light intensity measurement unit to measure a second light intensity value of the second light beam;
  compare the measured first and second light intensity values with the target intensity value;
  adjust the first operative parameter and the second operative parameter based on the comparison to derive a first adjusted operative parameter and a second adjusted operative parameter; and
  use the adjusted operative parameters during a measurement. Further more and optionally to the alternative embodiment, a narrow band filter to filter is arranged to filter light beams received by the light intensity measurement unit. Further optionally to the alternative embodiment, the the narrow band filter is arranged to filter light beams emitted by the first and second emitters of the light source.

According to an alternative embodiment according to present disclosure a method of operating a measurement device for measuring a distance, the measurement device comprising:
  a light source comprising a first emitter and a second emitter;
  a light intensity measurement unit; and
  a controller operatively coupled to the first and second emitter of the light source and the light intensity measurement unit,
wherein the method comprises:
  setting a target intensity value;
  setting a first operative parameter for the first emitter;
  setting a second operative parameter for the second emitter;
  emitting, with the first emitter, a first light beam using the first operative parameter;
  measuring, with the light intensity measurement unit, a first light intensity value of the first light beam;
  emitting, with the second emitter, a second light beam using the second operative parameter;
  measuring, with the light intensity measurement unit, a second light intensity value of the second light beam;
  comparing the measured first and second light intensity values with the target intensity value;
  adjusting the first operative parameter and the second operative parameter based on the comparison to derive a first adjusted operative parameter and a second adjusted operative parameter; and using the adjusted operative parameters during the measurement of the distance.

Further more and optionally to the alternative embodiment, the method comprises arranging a narrow band filter to filter light beams received by the light intensity measurement unit. Further optionally to the alternative embodiment, the method comprises arranging the narrow band filter to filter light beams emitted by the first and second emitters of the light source.

In an embodiment, the LiDAR device of the present disclosure is mounted in a vehicle, such as an autonomous or semi-autonomous vehicle.

In a one example a measurement device comprises a light source. The light source comprises two laser diode light bars (i.e. two emitters). Each laser diode light bar is driven separately with a own driver. An example of a driver is an electronic laser driver with 1-50 kW of momentary (peak power) power. The laser drivers might be synchronized with each others. Each electronic laser driver are configured with their own (first, second) parameters. Each laser driver drives a single laser diode bar. Each laser diode bar has their own characteristic central wavelength (which may vary e.g. 1-5 nm) and distribution (all close to gaussian). The measurement device comprises a controller. The controller either
1) triggers one driver (and the corresponding bar) at a time, and measures; selects a linear combination of the driver current to optimize the intensity of emitted light,
2) triggers both drivers at the same time with two (or more) combination of first and second parameters, and selects the combination that is closest to the target intensity or
3) triggers both drivers at the same time with two (or more) combination of first and second parameters, and selects the combination that is closest to the target intensity, but does not select any of the tried combinations, but estimates the optimal parameters combination based on the tried (first and second) parameters.

DETAILED DESCRIPTION OF THE DRAWINGS

Figure 1B:
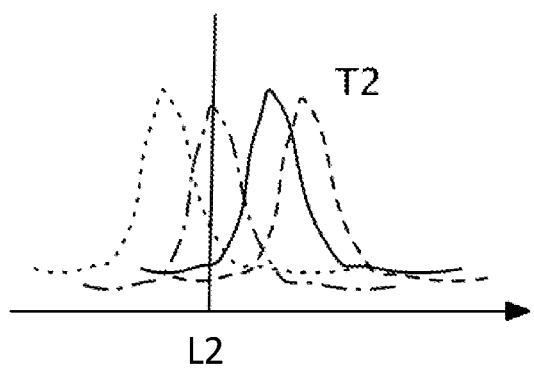

Referring to FIGS. 1A-1B, illustrated are exemplary spectral diagrams of an exemplary emitter for two different operating temperature conditions. As depicted, in each of the diagrams of FIGS. 1A-1B, the multiple curves represent spectrum of wavelengths emitted by an emitter for any single operating conditions. Herein, "L1" represent central wavelength for the emitter for corresponding operating condition "T1," and "L2" represent central wavelength for the corresponding operating condition "T2" for the same exemplary emitter. As may be seen that the central wavelength of the emitter may change with the operating temperature of the emitter, and other external factors which may affect the operating temperature of the emitter. As noted earlier, since the intensity of the light beam emitter by the emitter is dependent on the central wavelength thereof, thus with the change in operating temperature, there may be variation in the intensity of the emitted light beam from the emitter.

Figure 2:
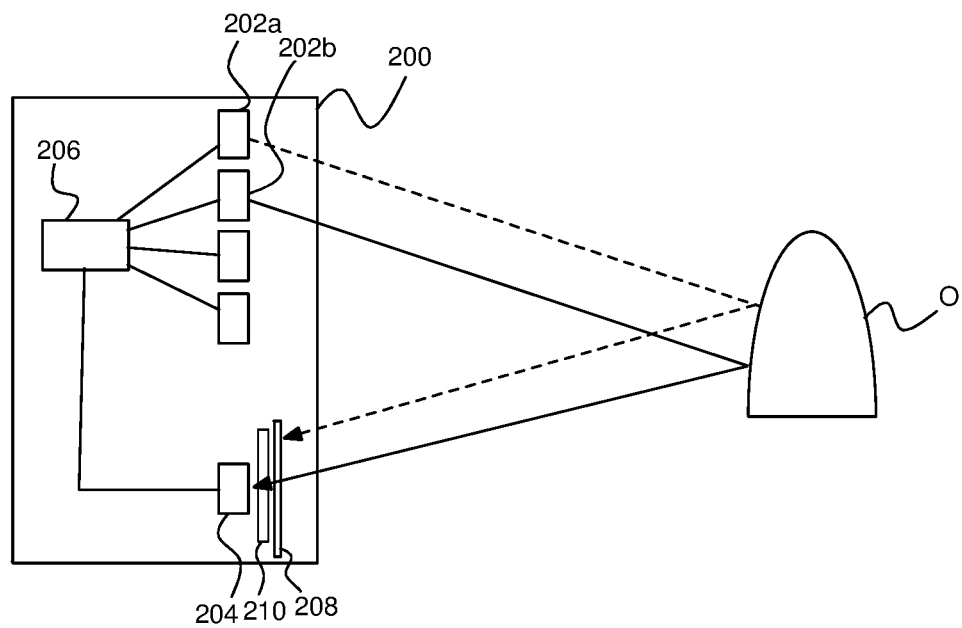
FIG. 2 is a schematic illustration of an arrangement for a measurement device, in accordance with an embodiment of the present disclosure.
Figure 3:
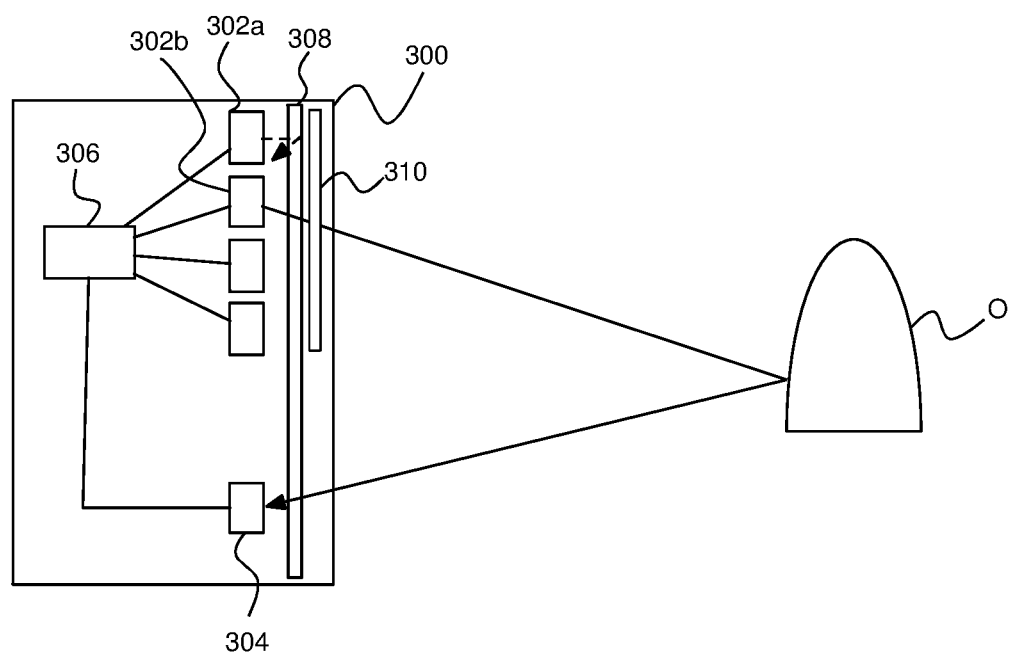
FIG. 3 is a schematic illustration of an arrangement for a measurement device, in accordance with another embodiment of the present disclosure.

FIGS. 2-3 illustrate two alternative arrangements for a LiDAR device in accordance with embodiments of the present disclosure. In FIG. 2, as illustrated, the LiDAR device 200 includes a plurality of emitters, including a first emitter 202a and a second emitter 202b configured to emit light beams towards a target object 'O'. The LiDAR device 200 also includes a receiver 204 arranged on co-incident axis of the emitters therein. Further, the LiDAR device 200 includes a controller 206 operatively connected to each of the plurality of emitters, including the first emitter 202a and the second emitter 202b. The controller 206 is also operatively connected to the receiver 204. Further, the LiDAR device 200 includes a narrow band filter 208 arranged in front of the receiver 204 so as to filter the light beams received therein. In the arrangement as illustrated in FIG. 2, the narrow band filter 208 is configured to filter the light beams passed to the receiver 204 from the emitters, such as the first emitter 202a and the second emitter 202b. As shown, the narrow band filter 208 is adapted such that the first light beam (shown in dashed line) emitted from the first emitter 202a is filtered out by the narrow band filter 208, and the second light beam (shown in solid line) emitted from the second emitter 202b is allowed to pass through. Further, the LiDAR device 200 includes a light intensity measurement unit 210 arranged with the narrow band filter 208, between the receiver 204 and the narrow band filter 208. The light intensity measurement unit 210 is configured to measure intensities of the light beams received at the receiver 204.

In FIG. 3, as illustrated, the LiDAR device 300 includes a plurality of emitters, including a first emitter 302a and a second emitter 302b configured to emit light beams towards a target object 'O'. The LiDAR device 300 also includes a receiver 304 arranged on co-incident axis of the emitters therein. Further, the LiDAR device 300 includes a controller 306 operatively connected to each of the plurality of emitters, including the first emitter 302a and the second emitter 302b. The controller 306 is also operatively connected to the receiver 304. Further, the LiDAR device 300 includes a narrow band filter 308 arranged in front of the emitters, including the first emitter 302a and the second emitter 302b, and the receiver 304. In the arrangement as illustrated in FIG. 3, the narrow band filter 308 is configured to filter the light beams emitted by the emitters, such as the first emitter 302a and the second emitter 302b, based on its configuration. As shown, the narrow band filter 308 is adapted such that the first light beam (shown in dashed line) emitted from the first emitter 302a is filtered out by the narrow band filter 308, and the second light beam emitted from the second emitter 302b (shown in solid line) is allowed to pass through. Further, the LiDAR device 200 includes a light intensity measurement unit 210 arranged with the narrow band filter 208 in front of the emitters, including the first emitter 302a and the second emitter 302b. The light intensity measurement unit 210 is configured to measure intensities of the light beams emitted by the emitters, including the first emitter 302a and the second emitter 302b.

Figure 4:
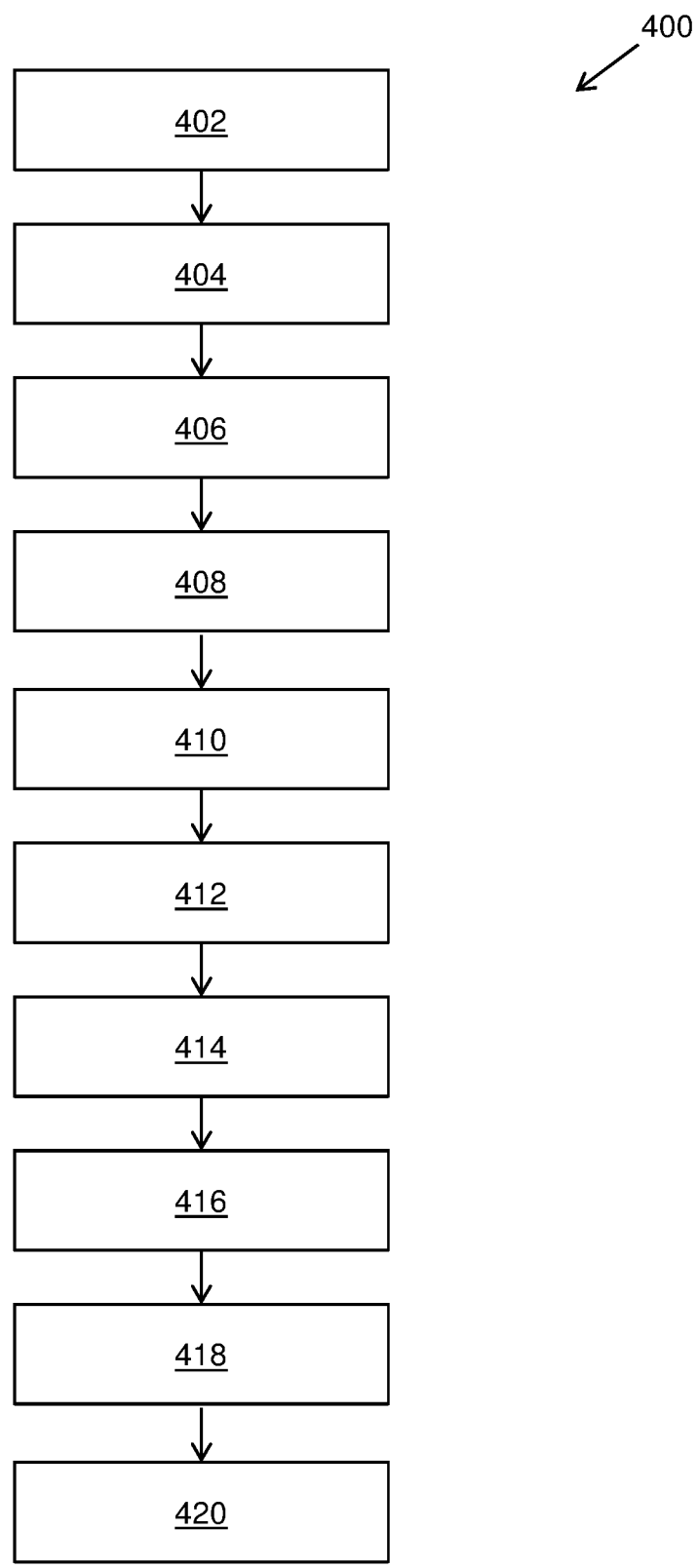
FIG. 4 is an illustration of steps of a method of operating a measurement device, in accordance with an embodiment of the present disclosure.

Referring to FIG. 4, there is shown an illustration of steps of method 400 of operating a measurement device, in accordance with an embodiment of the present disclosure. At a step 402, a target intensity value is set. At a step 404, a first operative parameter for the first emitter. At step 406, a second operative parameter for the second emitter is set. At step 408, a first light beam is emitted using the first operative parameter with the first emitter. At step 410, a second light beam is emitted using the second operative parameter with the second emitter. At step 412, a first light intensity value of the first light beam is measured with the light intensity measurement unit. At step 414, a second light intensity value of the second light beam is measured with the light intensity measurement unit. At step 416, the measured first and second light intensity values are compared with the target intensity value. At step 418, the first operative parameter and the second operative parameter are adjusted based on the comparison to derive a first adjusted operative parameter and a second adjusted operative parameter. At step 420, the adjusted operative parameters are used during the measurement of the distance in the LiDAR device.

The steps 402 to 420 are only illustrative and other alternatives can also be provided where one or more steps are added, one or more steps are removed, or one or more steps are provided in a different sequence without departing from the scope of the claims herein.

Figure 5:
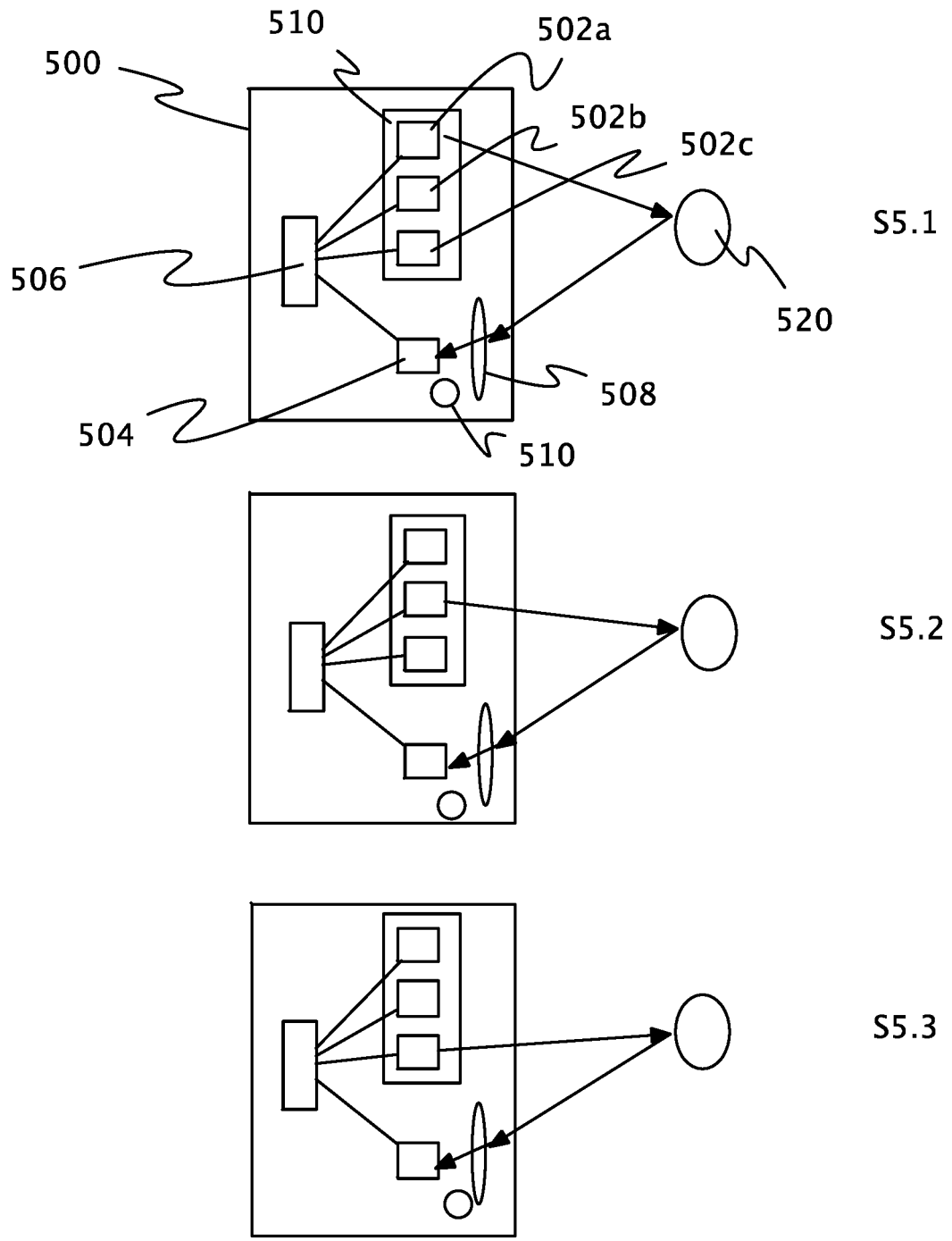
FIG. 5 is an illustration of configuration steps for a measurement device, in accordance with an embodiment of the present disclosure

FIG. 5 is an illustration of example steps according to disclosure. A measurement device 500 is configured with steps of S5.1, S5.2 and S5.3. In step S5.1 a first emitter 502a of a light source 510 is used to emit a first light beam with a first operative parameter (such as current of 100 mA). The first light beam reflects back from object 520 via a narrow band filter 508 arranged to filter light arriving to a light intensity measurement unit 504. The light intensity measurement unit 504 can be same light receiver than is used in normal operation of Lidar or it can be a separate dedicated light intensity measurement unit which is used during the configuration phase. In alternative/optional setup a light measurement unit is a separate light intensity measurement unit 510 as shown in the FIG. 5. Reflected light beam from the object 520 can be used for configuration purposes but since the object might be arbitrary at arbitrary distance from the measurement device the light reflection from internal part (such as window/opening/housing) of the measurement device can be also considered as the object 520. Controller 506 is operatively coupled to the first emitter and to the light intensity measurement unit. Similarly as with the first emitter in in step S5.2 a second emitter 502b is configured to emit a second beam of light and respective light intensity is measured with the light intensity measurement unit using a second operative parameter (such as 100 mA current). Further in step S5.3 a third emitter 502c is configured to emit a third beam of light and respective light intensity is measured with the light intensity measurement unit using a third operative parameter (such as 100 mA current). After the measurements the operative parameters are adjusted. For example if the second emitter 502b provides intensity value which is closest to a set target intensity value the first operating parameters of measurement device is adjusted to 100 mA (i.e. during the measurement the second emitter 502b is used). The operating parameter for the first and the second emitter set to 0 mA (i.e during the measurement the first and the second emitter are not used).

Figure 6:
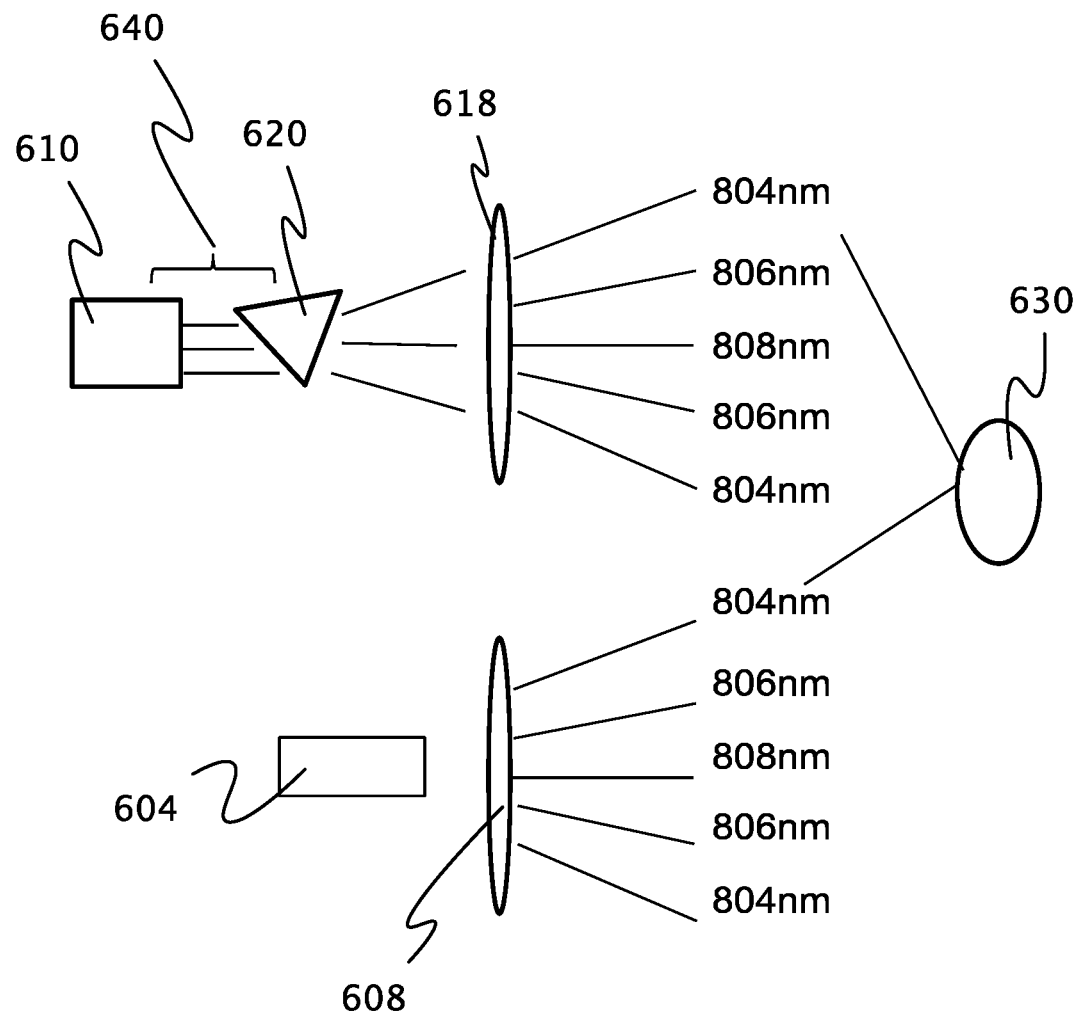
FIG. 6 is an illustration of an embodiment of a measurement device in accordance with an embodiment of the present disclosure.

FIG. 6 is an illustration of a setup wherein a second thin-film narrow band filter 618 is arranged in an optical path between a light source 610 and an object 630 (a filter for the light source). A first thin-film a narrowband filter 608 is arranged in an optical path between the object 630 and a receiver 604 (a filter for receiver). Setup in FIG. 6 the second narrowband filter 618 and the first narrowband filter 608 are angle-tuned spectral filters. Filters for the light source 610 (second filter) and receiver 604 (first filter) have thus same filtered wavelength shift as a function of the angle of arrival from the normal. In addition this set up results field of views to be matched. This is beneficial as the filter 618 for the light source 610 and the filter 608 for the receiver 604 filter the light to and from the object 630 similarly (regardless of the filter angular dispersion). In further example an optional prism 620 is arranged between the light source 610 and the first filter 618. Rotating the prism 620 enables to select wavelengths which are emitted from the measurement device from a set of wavelengths 640. As an example if the light source has central wavelength of 808 nm and has width of 30 nm (640) the set up enables to select appropriate wavelengths for the first filter. This enables to emit narrow band light which is matched with receivers narrowband filter. Further a setup of the FIG. 6 enables to have the light source 610 with a single physical emitter which can be considered to provide light beams as those were originating from two or more emitters (the light source 610 can be considered to comprise plurality of perceived emitters).

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A measurement device for measuring a distance, comprising:
   a light source comprising a first emitter and a second emitter;
   a light intensity measurement unit; and
   a controller operatively coupled to the first and second emitter of the light source and the light intensity measurement unit, wherein the controller is operable to:
   set a target intensity value;
   set a first operative parameter for the first emitter;
   set a second operative parameter for the second emitter;
   configure the first emitter to emit a first light beam using the first operative parameter;
   configure the light intensity measurement unit to measure a first light intensity value of the first light beam;
   configure the second emitter to emit a second light beam using the second operative parameter;
   configure the light intensity measurement unit to measure a second light intensity value of the second light beam;
   compare the measured first and second light intensity values with the target intensity value;
   adjust the first operative parameter and the second operative parameter based on the comparison to derive a first adjusted operative parameter and a second adjusted operative parameter; and
   use the adjusted operative parameters during a measurement
   wherein a first narrow band filter is arranged to filter the light beams received by the light intensity measurement unit and a second narrow band filter is arranged to filter the light beams emitted by the light source, and the first narrow band filter and the second narrow band filter are selected to be one of matched angle-tuned spectral filters or 0.5-3 nanometers bandwidth filter.

2. A measurement device according to claim 1, wherein the light intensity measurement unit is a broadband receiver.

3. A measurement device according to claim 1, wherein the light source comprises more than two emitters and the emitters are arranged in a pattern.

4. A measurement device according to claim 1, wherein the first operative parameter is configured to be adjusted to a zero value and the second operative parameter is configured to be adjusted to a measurement operating value if, based on the comparison, the second light intensity value is closer to the target intensity value than the first intensity value.

5. A measurement device according to claim 1, wherein the first operative parameter is configured to be adjusted to a zero value and the second operative parameter is configured to be adjusted to a first measurement operating value if, based on the comparison, both the first measured intensity value and the second measured intensity value are within a predefined range from the target intensity value, and power consumption of the first emitter is higher than the power consumption of the second emitter.

6. A measurement device according to claim 1, wherein the second operative parameter is configured to be adjusted to a second measurement operating value and the first operative parameter is configured to be adjusted a third measurement operating value if, based on comparison, a combination of the first light intensity value and the second light intensity value is within a predefined range from the target intensity value.

7. A measurement device according to claim 1, wherein the controller is operable to configure the light source to utilize the adjusted parameters for measurement purposes for a predefined period of time.

8. A measurement device according to claim 7, wherein the controller is operable to repeat steps for adjusting the first or second operative parameters after expiry of the predefined period of time to further adjust the operative parameters.

9. A measurement device according to claim 1, wherein the target intensity value is a function of a target measurement distance range.

10. A measurement device according to claim 1, wherein the first emitter and the second emitter are configured to emit light with a central wavelength different from each other.

11. A measurement device according to claim 1, wherein the measurement device is a Light Detection and Ranging device.

12. A method of operating a measurement device for measuring a distance, the measurement device comprising:

a light source comprising a first emitter and a second emitter;

a light intensity measurement unit; and a controller operatively coupled to the first and second emitter of the light source and the light intensity measurement unit, wherein the method comprises:

setting a target intensity value;

setting a first operative parameter for the first emitter;

setting a second operative parameter for the second emitter;

emitting, with the first emitter, a first light beam using the first operative parameter;

measuring, with the light intensity measurement unit, a first light intensity value of the first light beam;

emitting, with the second emitter, a second light beam using the second operative parameter;

measuring, with the light intensity measurement unit, a second light intensity value of the second light beam;

comparing the measured first and second light intensity values with the target intensity value;

adjusting the first operative parameter and the second operative parameter based on the comparison to derive a first adjusted operative parameter and a second adjusted operative parameter;

using the adjusted operative parameters during the measurement of the distance;

arranging a first narrow band filter to filter the light beams received by the light intensity measurement unit and a second narrow band filter to filter the light beams emitted by the light source; and wherein the adjusting of the first operative parameter and the second operative parameter comprises adjusting the first operative parameter to a zero value and adjusting the second operative parameter to a measurement operating value, if based on the comparison, the second light intensity value is closer to the target intensity value than the first intensity value.

13. A method according to claim 12, wherein the adjusting of the first operative parameter and the second operative parameter comprises adjusting the first operative parameter to a zero value and the second operative parameter to a first measurement operating value if, based on the comparison, both the first measured intensity value and the second measured intensity value are within a predefined range from the target intensity value; and power consumption of the first emitter is higher than the power consumption of the second emitter.

14. A method according to claim 12, wherein the adjusting of the first operative parameter and the second operative parameter comprises adjusting the second operative parameter to a second measurement operating value and the first operative parameter to a third measurement operating value if, based on comparison, combination of the light first intensity value and the second light intensity value is within a predefined range from the target intensity value.

15. A method according to claim 12, further comprising utilizing the adjusted parameters for measurement purposes for a predefined period of time.

16. A method according to claim 15, further comprising adjusting the operative parameters further after expiry of the predefined period of time.

17. A method according to claim 12, wherein the target intensity value is calculated as a function of a target measurement distance range.

* * * * *